US010863219B2

(12) United States Patent
Srinivasan et al.

(10) Patent No.: US 10,863,219 B2
(45) Date of Patent: Dec. 8, 2020

(54) SYSTEMS AND METHODS FOR IDENTIFYING UNKNOWN USERS OF A DEVICE TO PROVIDE PERSONALIZED USER PROFILES

(71) Applicant: Rovi Guides, Inc., San Jose, CA (US)

(72) Inventors: Madhusudhan Srinivasan, Bangalore (IN); Gaurav Gandhi, Bengaluru (IN); Siddhartha Pande, Bengaluru (IN)

(73) Assignee: Rovi Guides, Inc., San Jose, AZ (US)

( * ) Notice: Subject to any disclaimer, the term of this patent is extended or adjusted under 35 U.S.C. 154(b) by 0 days.

(21) Appl. No.: 16/365,283

(22) Filed: Mar. 26, 2019

(65) Prior Publication Data
US 2020/0314471 A1   Oct. 1, 2020

(51) Int. Cl.
| *H04N 21/25*  | (2011.01) |
| *H04N 21/45*  | (2011.01) |
| *H04N 21/258* | (2011.01) |
| *H04N 21/475* | (2011.01) |
| *H04L 29/08*  | (2006.01) |

(52) U.S. Cl.
CPC ......... *H04N 21/252* (2013.01); *H04L 67/306* (2013.01); *H04N 21/25841* (2013.01); *H04N 21/4532* (2013.01); *H04N 21/4755* (2013.01)

(58) Field of Classification Search
CPC ............. H04N 21/252; H04N 21/4755; H04N 21/4532; H04N 21/25841; H04N 21/4667; H04N 21/25891; H04N 21/44222; H04N 21/251; H04N 21/4668; H04N 21/44204; H04N 21/4524; H04N 21/6582; H04L 67/306; G06F 16/9535; G06F 21/316; G06F 16/248
USPC .......................................................... 725/14
See application file for complete search history.

(56) References Cited

U.S. PATENT DOCUMENTS

| 7,730,546 | B2 * | 6/2010  | Aoki ....................... G06F 21/31 713/166 |
| 8,595,834 | B2   | 11/2013 | Xie et al. |
| 9,485,318 | B1 * | 11/2016 | Harris .................... H04W 4/029 |
| 10,194,313 | B1 * | 1/2019 | Karimli ................. H04W 12/06 |
| 2002/0104087 | A1 * | 8/2002 | Schaffer ................. H04N 7/163 725/46 |
| 2003/0083938 | A1 * | 5/2003 | Smith ..................... H04L 29/06 705/14.53 |
| 2013/0219518 | A1 * | 8/2013 | Sambamurthy ....... G06F 21/554 726/28 |
| 2015/0234939 | A1 * | 8/2015 | Aharony ............. G06F 16/9537 707/737 |
| 2016/0182502 | A1 * | 6/2016 | Smith ................... G06F 21/316 726/7 |
| 2016/0345039 | A1 * | 11/2016 | Billmeyer .......... H04N 21/2541 |
| 2017/0180388 | A1 * | 6/2017 | Belz .................... H04L 63/0853 |

* cited by examiner

*Primary Examiner* — Cynthia M Fogg
(74) *Attorney, Agent, or Firm* — Haley Guiliano LLP

(57) ABSTRACT

Systems and methods are disclosed for activating a personalized user profile on a device based on the detection of an outlying user input. A media guidance application detects a user input that is inconsistent with an active user profile. In response, the media guidance application identifies a candidate user that both shares a location with the device and has a user profile consistent with the user input. The media guidance application activates the user profile of the candidate user as a temporary active user profile on the device.

20 Claims, 13 Drawing Sheets

SYSTEMS AND METHODS FOR IDENTIFYING UNKNOWN USERS OF A DEVICE TO PROVIDE PERSONALIZED USER PROFILES

BACKGROUND

The present disclosure is directed to media guidance applications, and more particularly to media guidance applications that provide content recommendations based on user profiles.

SUMMARY

Media guidance applications produce tailored recommendations based on user activity (e.g., search and viewing history) and user preferences (e.g., ratings). A media guidance application may fail to recognize certain user activities as outliers, however, thus polluting recommendations with content that a user may not wish to view. For example, a user may view a set of comedy videos on a video streaming platform such as YouTube™ on the user's mobile device. Based on the user's viewing history, YouTube may appropriately recommend additional comedy videos to the user. If the user's friend borrows the mobile device and begins watching a horror video on YouTube, the viewing history on the mobile device includes both horror and comedy videos. Even if the original user dislikes horror videos, because YouTube does not identify the horror video as an outlier, new recommendations will include unviewed horror and comedy videos. In this scenario, the user's recommendations are polluted by videos that the user does not wish to view. From the perspective of the user's friend who borrowed the mobile device, it is possible that the friend isn't interested in comedy videos and thus the previously existing comedy recommendations are not relevant for the user's friend either.

Because devices such as set-top boxes, smart televisions, smartphones, etc., are commonly shared, user profiles can be polluted by outlying user inputs. A media guidance application that relies on these user profiles to produce content recommendations can therefore be susceptible to making poor recommendations. Systems and methods are thus described herein for activating a personalized user profile on a device based on the detection of an outlying user input.

In one embodiment, a media guidance application receives a user input on a device and compares the user input with an active user profile on the device. Based on the comparison, the media guidance application may determine that the user input is inconsistent with the active user profile and should be considered an outlier (i.e., not to be included in the active user profile, thus preserving the personalized recommendations and settings of the active user profile). The media guidance application additionally attempts to identify the user that provided the user input in order to activate another user profile for temporary usage. Because sharing a location with the device is an indication of potential device use, the media guidance application identifies a candidate user that is located in the same location as the device. The media guidance application determines whether the user input is consistent with the user profile of the candidate user and, in response to determining that the user input is in fact consistent with the candidate user's user profile, the media guidance application activates the user profile of the candidate user as a temporary active user profile on the device.

Identifying an inconsistent user input (used herein interchangeably with "outlying user input") involves determining, based on historic user activity, whether the user input is one that the user associated with the active user profile would normally provide. In some embodiments, the media guidance application determines whether the user input matches any previously received user inputs stored on the active user profile. If the media guidance application cannot determine a match, the media guidance application deems the user input inconsistent with the active user profile.

Likewise, usage patterns and input times are common giveaways of inconsistent user input. In some embodiments, the media guidance application determines a receipt time of the user input. The media guidance application further determines a usage period of the device representing a window of time in which the user associated with the active user profile normally provides inputs. In determining that the receipt time of the user input is not within the usage period, the media guidance application identifies the user input as inconsistent with the active user profile.

For a particular type of user input, such as a search command for a media asset, the media guidance application in some embodiments identifies a genre of the media asset and determines, from previously received user inputs in the active user profile, whether a prior search exists for a different media asset that shares the genre. If the media guidance application does not find a prior search for a different media asset sharing the genre, the media guidance application identifies the user input as inconsistent with the active user profile.

The detection of an outlying user input causes the media guidance application to identify the user providing the outlying user input. In some embodiments, the media guidance application selects the candidate user from a list of candidate users in the active user profile of the device. The list of candidate users may be a list of social media connections associated with an owner of the device, a list of contacts stored on the device, or a list of owners of the device. In particular, the media guidance application identifies a first candidate user from the list of candidate users and retrieves location information of the first candidate user. The media guidance application may retrieve the location information from various sources such as a social media profile of the first candidate user, metadata of media uploaded to a website by the first candidate user, a message on the device received from the first candidate user, a global-positioning system (GPS) tracker on a different device belonging to the first candidate user, and a travel record of the first candidate user. In response to determining that the location information matches the first location, the media guidance application selects the first candidate user as the candidate user. If the location information does not match, the media guidance application searches for another candidate user in the list (e.g., a second candidate user, a third candidate user, etc.).

The media guidance application then confirms whether the candidate user is indeed the user that provided the user input by determining whether the user input is consistent with normal user activity of the candidate user. Accordingly, the media guidance application retrieves a user profile of the candidate user from a server with stored user profiles or a device of the candidate user, and utilizes the processes previously described to evaluate consistency. For example, the media guidance application may compare the usage period, previously received user inputs, and media asset searches stored in the user profile of the candidate user with the user input received by the device. In response to determining that the user input is consistent with the user profile of the candidate user, the media guidance application activates the user profile of the candidate user as the temporary active user profile on the device. Otherwise, the media guidance application may select a different candidate user from a list of candidate users on the active user profile.

In some embodiments, the media guidance application may confirm the identity of the candidate user by generating, for display on the device, a query to confirm whether the user input was received from the candidate user. In response to receiving a confirmation to the query, the media guidance application activates the user profile of the candidate user as the temporary active user profile on the device.

Once the temporary active user profile is activated on the device, the media guidance application may receive an additional user input on the device from the candidate user. Accordingly, the media guidance application updates the temporary active user profile based on the additional user input and sends a copy of the updated temporary active user profile to a different device of the candidate user. This allows for the candidate user's activity on the device to be recorded on the candidate user's personal device, even if the temporary active user profile is deactivated on the current device at a later time.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
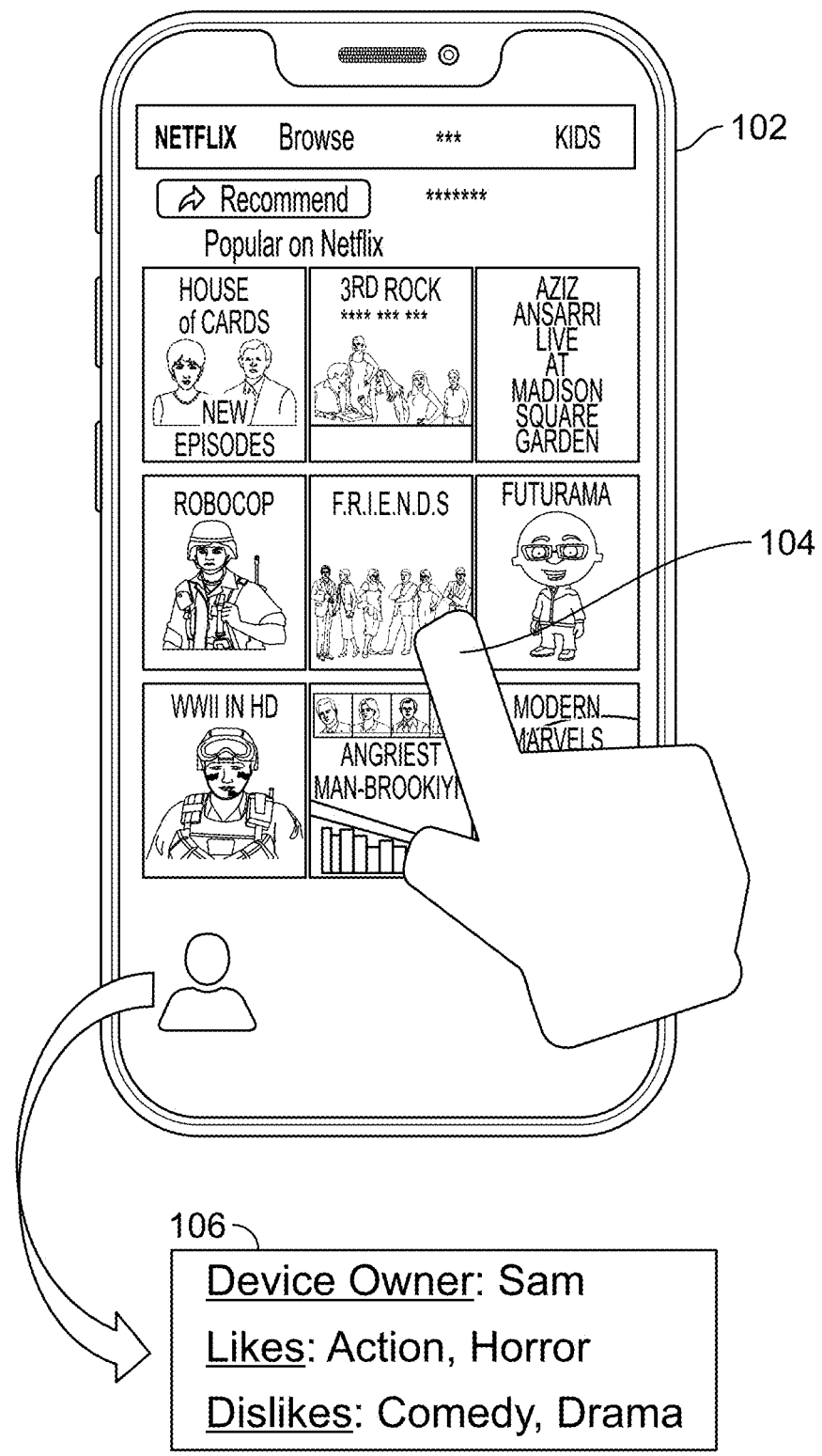
FIG. 1 shows an illustrative example of receiving a user input that is inconsistent with an active user profile on a device, in accordance with some embodiments of the disclosure.

FIG. 1 shows illustrative example 100 of receiving a user input that is inconsistent with an active user profile on a device, in accordance with some embodiments of the disclosure. Device 102 (e.g., a smartphone) is displaying a media content application for streaming videos (e.g., the Netflix™ mobile application). User input 104 reflects a selection of the media asset "Friends" from a plurality of media assets on the Netflix interface. Active user profile 106 represents a user profile that is being accessed on device 102. Active user profile 106 may be managed by the content provider of the media assets (e.g., Netflix) and may be activated by the media guidance application when the user of device 102 enters his/her access credentials to log in to the streaming account (e.g., provides a username and password to the Netflix mobile application).

Active user profile 106 indicates that the name of the user is "Sam" and that the user prefers media assets of the "action" and "horror" genres. In contrast, the user dislikes "comedy" and "drama" genres. One skilled in the art would appreciate that user preferences can vary from liking a specific genre/sub-genre, liking an actor, liking particular shows/movies, etc. Likewise, a user may dislike a specific genre/sub-genre, dislike an actor, etc. The likes and dislikes depicted in active user profile 106 may be generated based on the viewing and search histories of the user.

In response to receiving user input 104 on device 102, the media guidance application determines whether user input 104 is consistent with active user profile 106. For example, the media guidance application determines that user input 104 is a selection of a particular media asset "Friends." The media guidance application assesses whether user input 104 is an input that the user would normally make based on previous usage activity. In this example, the media guidance application determines whether the user would select the media asset "Friends" for viewing, based on the user's previous selections and content preferences. It should be noted that user input 104 is not limited to the selection or search for a media asset. For example, user input 104 may be the configuration of a platform setting such as a parental control adjustment. Accordingly, the media guidance application will determine whether the user would normally make the parental control adjustment.

The media guidance application may analyze historic usage activity of the user to determine whether a user input is an outlier or is one that the user would normally make. An indication that the user input has been previously made by the user provides reason that the user input is one the user would make. Specifically, the media guidance application retrieves, from the active user profile, a plurality of previously received user inputs. The previously received user inputs may include searches, media asset selections, setting configurations, and rating changes for media assets. The media guidance application compares the user input with the plurality of previously received user inputs to determine whether the user input is one that the user associated with active user profile 106 has previously made. The media guidance application determines that user input 104 is a selection of the media asset "Friends." Accordingly, the media guidance application determines whether the user previously selected the media asset "Friends" according to active user profile 106. In response to determining that user input 104 does not match any previously received user input of active user profile 106, the media guidance application determines that user input 104 is inconsistent with active user profile 106. This determination allows the media guidance application to exclude user input 104 from being recorded in active user profile 106 (i.e., a record of user input 104 is not entered in the plurality of previously received user inputs) and thus user input 104 does not influence future recommendations on the Netflix platform for active user profile 106. For example, the user will not receive recommendations to watch shows similar to "Friends" because the user did not in fact select "Friends" for viewing.

The media guidance application may also rely on previously received user inputs that are similar but do not exactly match user input 104. For example, a user may not have historically selected, viewed, or searched for "Friends." However, the user may have selected, viewed, or searched for a media asset that is similar to the show "Friends." The media guidance application identifies a genre of the selected media asset and determines whether a prior selection or search was performed for a media asset that shares that genre. For example, the user may have searched for a different media asset titled "How I Met Your Mother" a week before user input 104 was provided on device 102. Using metadata of the respective media assets, the media guidance application may determine that both shows are associated with the "comedy" genre. As a result, the media guidance application determines that user input 104 is consistent with active user profile 106 because the user has previously searched for or selected a different media asset that is similar to the selected media asset in user input 104. If the media guidance application did not find any previously selected or searched for different media asset with the common genre, the media guidance application may determine that user input 104 is inconsistent with active user profile 106. As referred to herein the genre of a media asset is not limited to broad classifications such as "comedy," "horror," or "drama," and may capture specific attributes of the media asset. For example, a genre may be "movies with George Clooney" or "television sit-coms set in New York City," hence capturing the cast and locations in a media asset.

The media guidance application may also use receipt times to determine user input consistency. For example, a user may have a typical schedule in which he/she provides user inputs to device 102. For example, the user associated with active user profile 106 may use device 102 between 8:00 am and 9:00 pm. Thus, if user input 104 is received at 11:45 pm, the media guidance application will determine an inconsistency of user input 104 with active user profile 106. In some embodiments, the user may have a typical schedule in which he/she provides a certain type of user input. Types of user inputs include a search for a media asset, a selection of a media asset, a setting configuration, trick-play selections, and application access. For example, the user may search for media assets to view on Netflix particularly between 8:00 pm and 8:30 pm. The media guidance application may determine that the receipt time of user input 104 is 4:00 pm and that this receipt time is not in the usage period associated with the "search" user inputs on Netflix. Accordingly, the media guidance application determines that user input 104 is inconsistent with active user profile 106.

Figure 2:
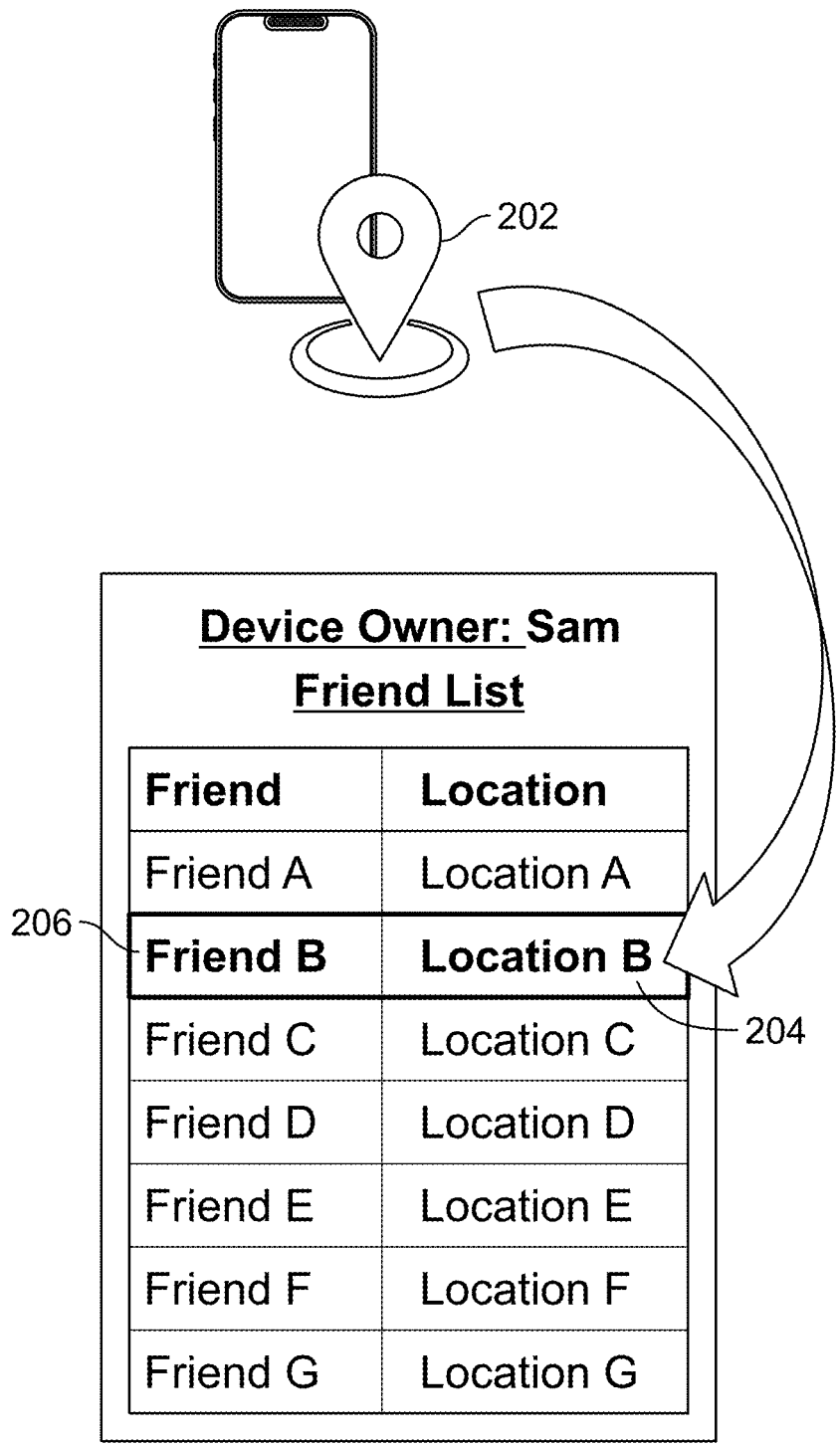
FIG. 2 shows an illustrative example of a candidate user lookup, in accordance with some embodiments of the disclosure.

FIG. 2 shows illustrative example 200 of a candidate user lookup, in accordance with some embodiments of the disclosure. In response to determining that user input 104 is inconsistent with active user profile 106, the media guidance application identifies a potential user that may have provided user input 104. The media guidance application may analyze active user profile 106 or any source that provides a list of individuals related to the user associated with active user profile 106. For example, the media guidance application determines that the device owner is named Sam and retrieves a list of candidate users related to Sam.

The list of candidate users may be a list of social media friends, a list of contacts stored on the device, or a list of owners of the device. The media guidance application may communicate with other third-party applications to retrieve the list of candidate users. For example, device 102 may also have a social media application (e.g., Facebook). The media guidance application may retrieve the account information of the social media application and the account information in active user profile 106 to determine whether the accounts on both applications belong to the same user, "Sam."

In response to determining that the accounts belong to the same user, the media guidance application retrieves a list of friends from the social media application. Example 200 depicts a friend list that includes a plurality of candidate users (e.g., Friend A, Friend B, etc.) and their respective locations (e.g., Location A, Location B). This friend list is generated by the media guidance application. In particular, the media guidance application identifies a candidate user from the list of candidate users (e.g., candidate user 206) and retrieves location information of the candidate user (e.g., location 204).

The media guidance application may retrieve the location information from various sources such as a social media profile of candidate user 206 (e.g., a location listed in the bio-page of candidate user 206 or a social media post indicating location), metadata of media uploaded to a website by candidate user 206 (e.g., a location found in the metadata of a photo the candidate user uploaded online), a message on the device received from candidate user 206 (e.g., a text message or email sent to device 102 indicating the location of candidate user 206), a global-positioning system (GPS) tracker on a different device of candidate user 206 (e.g., discussed in further detail in FIG. 5), and a travel record of candidate user 206.

In response to determining that location 204 matches location 202, which is the location of device 102, the media guidance application determines that candidate user 206 potentially provided user input 104. If the location 204 does not match location 202, the media guidance application compares the location for another candidate user in the list (e.g., Friend C, Friend D, etc.).

Figure 3:
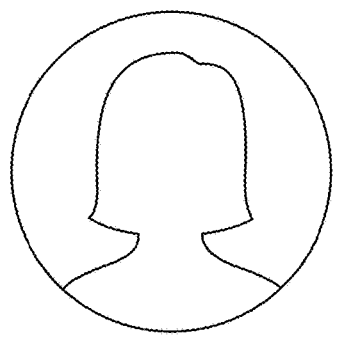
FIG. 3 shows an illustrative example for determining whether a user profile of a candidate user is consistent with the received user input, in accordance with some embodiments of the disclosure.
Figure 3:
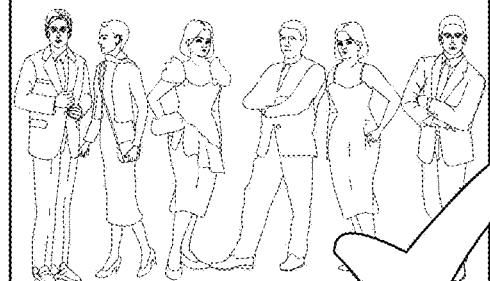

FIG. 3 shows illustrative example 300 for determining whether a user profile of a candidate user is consistent with the received user input, in accordance with some embodiments of the disclosure. In example 200, the media guidance application determines that candidate user 206 potentially provided user input 104 because location 204 of candidate user 206 matches location 202 of device 102. In response to finding a match, the media guidance application confirms whether candidate user 206 provided user input 104 by determining whether user input 104 is consistent with user profile 302 of candidate user 206. The determination of user input consistency can be performed by the media guidance application using the same processes used for active user profile 106 (discussed in FIG. 1). When retrieving the user profile of any candidate user, the media guidance application attempts to find a user profile of the candidate user that is similar to active user profile 106. For example, active user profile 106 may be generated by a content provider such as Netflix. Accordingly, the media guidance application retrieves a user profile that is from the same content provider (e.g., Netflix) or a similar content provider (e.g., video streaming platforms such as Hulu™, HBO Now™, etc.). In this example, user profile 302 is a Netflix profile of candidate user 206. Similar to active user profile 106, user profile 302 includes likes, dislikes, ratings, viewing history, search history, and account configuration information. In some embodiments, the media guidance application may retrieve only part of user profile 302 (e.g., viewing history) because candidate user 206 may set access restrictions to user profile 302, preventing the entire user profile from being accessed.

The media guidance application determines that user input 104 is consistent with user profile 302 because candidate user 206 may have previously viewed media asset 304 (e.g., "Friends") according to the viewing history of user profile 302. In some embodiments, the media guidance application determines that user input 104 is consistent with user profile 302 because user profile 302 indicates a preference of candidate user 206 for media asset 304 (e.g., "Friends" is either highly rated by candidate user 206 or is in her "liked" group of media assets). In some embodiments, the media guidance application determines that user input 104 is consistent with user profile 302 because candidate user 206 has viewed, searched, selected, or recorded, a media asset that shares a genre with media asset 304 (e.g., "How I Met Your Mother"). In response to determining that user input 104 is consistent with user profile 302 and that location 204 of candidate user 206 matches location 202 of device 102, the media guidance application determines that candidate user 206 has provided user input 104.

Figure 4:
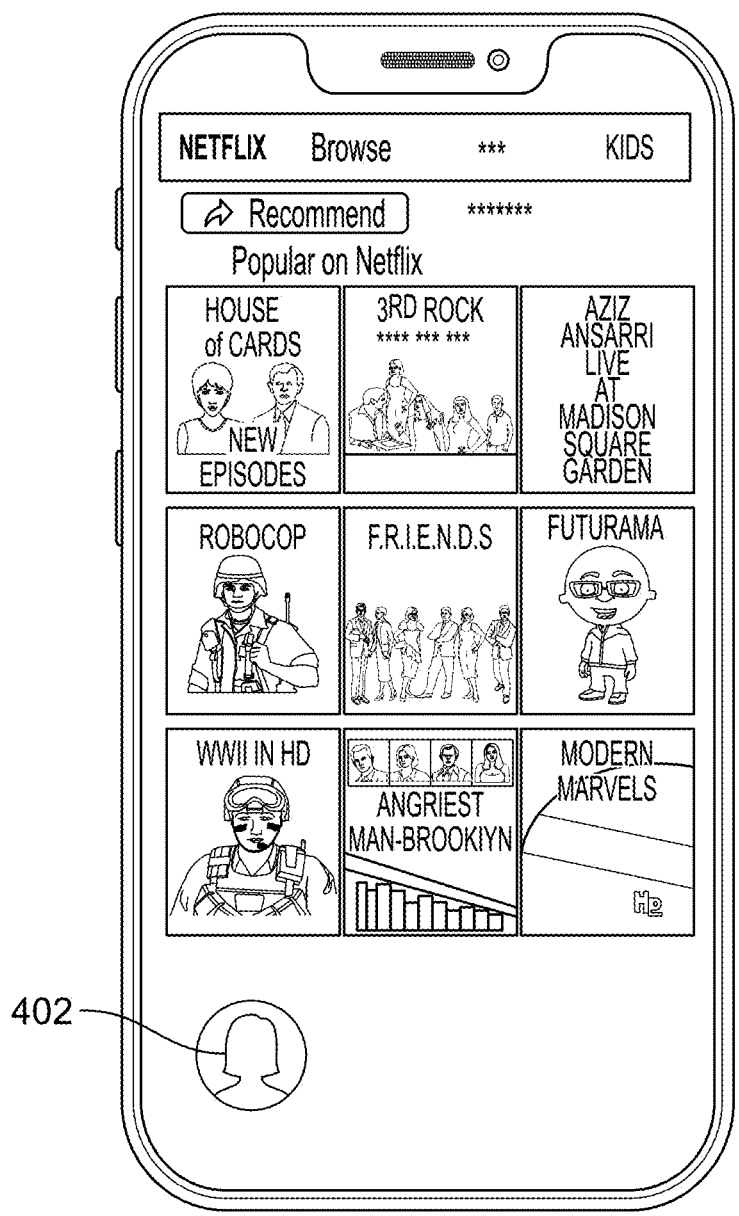
FIG. 4 shows an illustrative example of a device on which the user profile of the candidate user is activated, in accordance with some embodiments of the disclosure.

FIG. 4 shows illustrative example 400 of a device on which the user profile of the candidate user is activated, in accordance with some embodiments of the disclosure. To prevent user input 104, an outlying user input that is inconsistent with active user profile 106, from potentially polluting recommendations in active user profile 106, the media guidance application activates temporary profile 402 on device 102. For example, the media guidance application may log out from active user profile 106 (e.g., sign out from the Netflix account) and log in to user profile 302, which is the profile of candidate user 206. In order to log in to user profile 302 on device 102, the media guidance application retrieves access credentials of user profile 302 (e.g., username and password information of the Netflix account of candidate user 306). In some embodiments, prior to retrieving the access credentials of user profile 302 and subsequent to identifying candidate user 206 as the provider of user input 104, the media guidance application generates for display a query on device 102 asking the user to confirm whether he/she is candidate user 306. For example, the media guidance application may generate a display window on the smartphone stating, "Inconsistent User Input Detected: Are you Laura?" In response to receiving a positive confirmation from the user (e.g., selection of "Yes" or an affirmative vocal input such as "Yeah"), the media guidance application retrieves the access credentials of user profile 302. In response to receiving a negative confirmation from the user (e.g., selection of "No" or a vocal input such as "No"), the media guidance application identifies another candidate user, from the list of candidate users, that shares a location with device 102 and that has a user profile consistent with user input 104.

The media guidance application may determine that none of the candidate users in the list of candidate users shares a location with device 102 or that none of the candidate users in the list of candidate users has a user profile that is consistent with user input 104. In order to preserve active user profile 106 and prevent user input 104 from influencing any recommendations, the media guidance application may activate a generic user profile that is not associated with any previous user activity as the temporary active user profile. For example, the media guidance application may temporarily activate a default Netflix user profile given to new users.

In some embodiments, the media guidance application generates for display a query on device 102 asking the user to confirm whether he/she is the user associated with active user profile 106. For example, the media guidance application may generate a display window on the smartphone stating, "Inconsistent User Input Detected: Are you Sam?". In response to receiving a positive confirmation from the user (e.g., selection of "Yes" or an affirmative vocal input such as "Yeah"), the media guidance application determines that user input 104 is consistent with active user profile 106 and should be recorded because user input 104 is not in fact an outlier. In response to receiving a negative confirmation from the user (e.g., selection of "No" or a vocal input such as "No") and determining that the user cannot be identified from the list of candidate users, the media guidance application activates a generic user profile as the temporary active user profile.

The media guidance application may determine that more than one candidate user in the list of candidate users shares a location with device 102 and has a respective user profile that is consistent with user input 104. In this case, the media guidance application may generate for display a query on device 102. The query may list all of the possible candidate users that both share a location with device 102 and have a user profile that is consistent with user input 104. The media guidance application may then receive a selection of a candidate user from the list of possible candidate users presented in the query. In response to receiving a selection of the candidate user, the media guidance application retrieves access credentials of the candidate user's user profile and activates the user profile accordingly.

The media guidance application may determine that more than one candidate user in the list of candidate users shares a location with device 102 and has a respective user profile that is consistent with user input 104. For example, the media guidance application may determine that a first candidate user and the second candidate user are possible providers of user input 104. In response to this determination, the media guidance application determines an information overlap between a first user profile of the first candidate user and a second user profile of the second candidate user. The information overlap represents commonalties between the respective user profiles. For example, the media guidance application may sift through the viewing histories associated with both user profiles and identify media assets that appear in both viewing histories. The media guidance application may also determine shared "likes," "dislikes," and user settings in both user profiles. Based on these shared attributes and viewing histories, the media guidance application activates a shared generic user profile (e.g., a default Netflix profile given to first-time users) on device 102 and configures the shared generic user profile to incorporate the information overlap. Thus, the shared generic user profile comprises the shared "likes," "dislikes," settings and viewing histories of the first user profile and the second user profile. In some embodiments, the media guidance application merges the first user profile and the second user profile (e.g., combines the viewing histories, "likes," and "dislikes") to produce an aggregated user profile. The media guidance application then activates the aggregated user profile as the temporary active user profile on device 102.

The media guidance application generates temporary active user profile 402 to preserve active user profile 106. However, it is likely that the user associated with active user profile 106 may return to use device 102 after temporary active user profile 402 is activated. The media guidance application may reactivate active user profile 106. In some embodiments, the media guidance application receives an additional user input on device 102. The media guidance application determines whether the additional user input is inconsistent with temporary active user profile 402. In response to determining that the additional user input is inconsistent with temporary active user profile 402, the media guidance application determines whether the additional user input is inconsistent with active user profile 106. In response to determining that the additional user input is consistent with active user profile 402, the media guidance application deactivates temporary active user profile 402 (e.g., logs out from the Netflix account on device 102) and reactivates active user profile 106 (e.g., logs in to the Netflix account of the device owner on device 102).

In some embodiments, the media guidance application determines whether a user session has ended while temporary active user profile 402 is active on device 102. For example, the media guidance application may determine that the Netflix application has been closed on device 102. In response, the media guidance application deactivates temporary active user profile 402 and reactivates active user profile 106 when the Netflix application is reopened.

Figure 5:
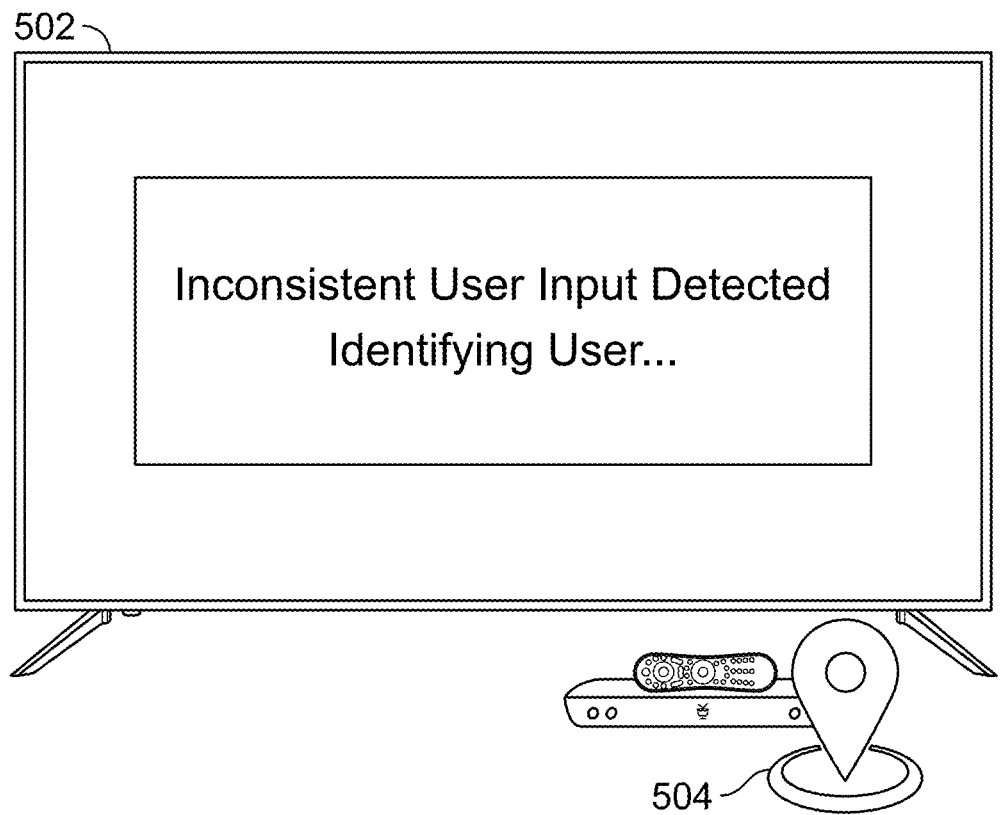
FIG. 5 shows an illustrative example for detecting the location of a candidate user via a device of the candidate user, in accordance with some embodiments of the disclosure.
Figure 5:
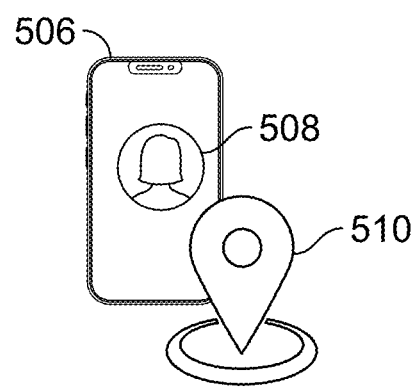

FIG. 5 shows illustrative example 500 for detecting the location of a candidate user via a device of the candidate user, in accordance with some embodiments of the disclosure. In example 500, 502 is the device (e.g., a home media system comprising a television and a set-top box). Location 504 represents the current location of device 502. In response to detecting an outlying user input (i.e., a user input inconsistent with the active user profile on device 502), the media guidance application identifies a candidate user that potentially provided the user input. In some embodiments, the media guidance application on device 502 transmits a discovery message (e.g., via Wi-Fi). In response to transmitting the discovery message, the media guidance application on device 502 may receive an acknowledgment message from device 506. The acknowledgment message may include location 510 (e.g., GPS coordinates of device 506). The media guidance application on device 502 determines whether location 504 and location 510 are within a threshold vicinity (e.g., five meters apart at a maximum). In response to determining that the respective locations are within the threshold vicinity, the media guidance application retrieves user profile 508 from device 506 and determines whether the user profile 508 is consistent with the user input. In response to determining that user profile 508 is consistent with user profile 508, the media guidance application activates user profile 508 as the temporary active user profile on device 502.

Figure 6:
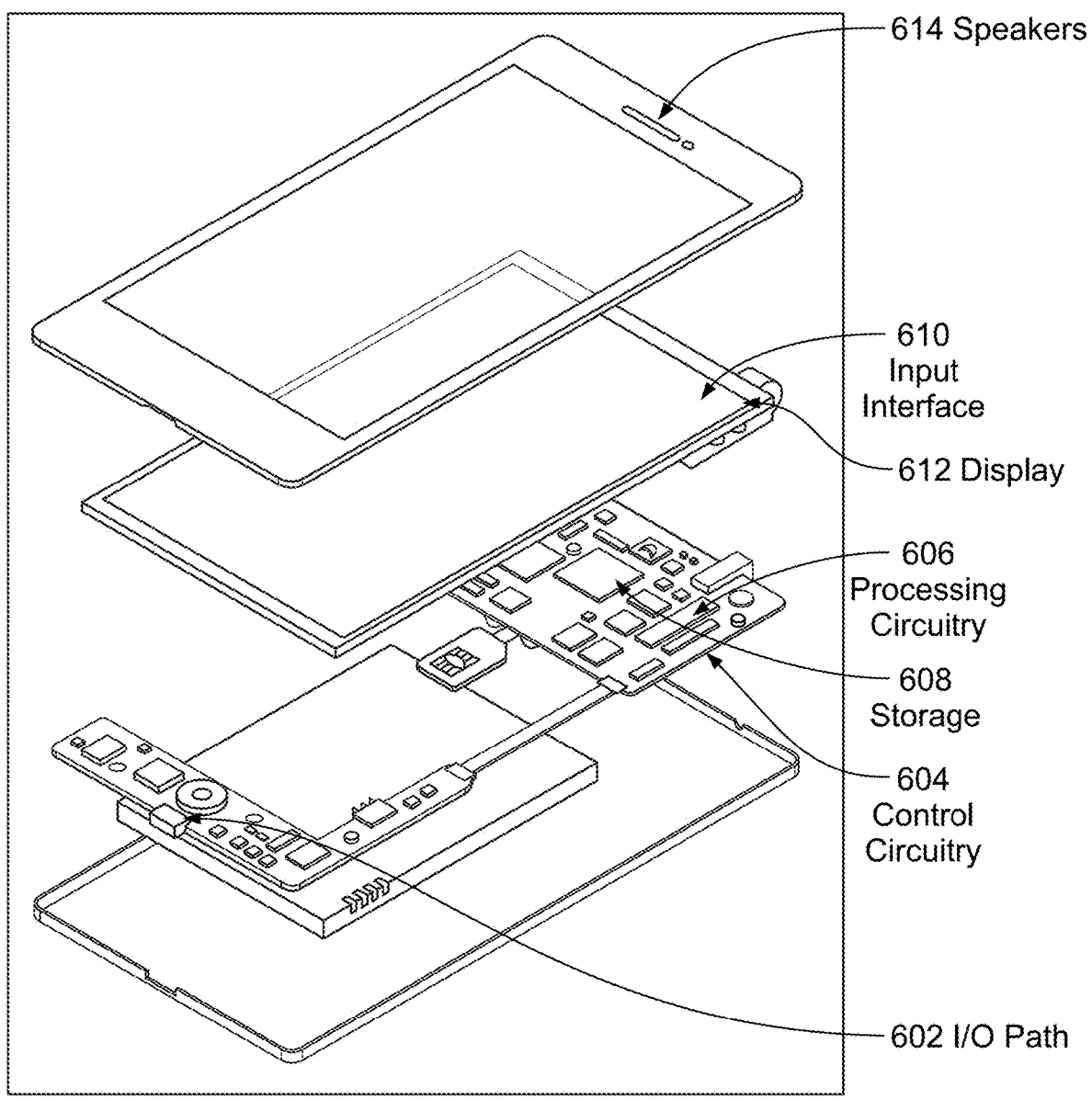
FIG. 6 is a diagram of an illustrative device in accordance with some embodiments of the disclosure.

FIG. 6 shows a generalized embodiment of illustrative device 600. As depicted in FIG. 6, device 600 is a smartphone. However, device 600 is not limited to smartphones and may be any computing device. For example, device 600 of FIG. 6 can be implemented in system 700 of FIG. 7 as device 702 (e.g., a smartphone, a video game console, a smart television, a smart speaker, a computer, or any combination thereof).

Device 600 may receive data via input/output (hereinafter "I/O") path 602. I/O path 602 may provide received data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608).

A media guidance application may be a stand-alone application implemented on a device or a server. The media guidance application may be implemented as software or a set of executable instructions. The instructions for performing any of the embodiments discussed herein of the media guidance application may be encoded on non-transitory computer readable media (e.g., a hard drive, random-access memory on a DRAM integrated circuit, read-only memory on a BLU-RAY disk, etc.) or transitory computer readable media (e.g., propagating signals carrying data and/or instructions). For example, in FIG. 6 the instructions may be stored in storage 608, and executed by control circuitry 604 of a device 600.

In some embodiments, a media guidance application may be a client-server application where only the client application resides on device 600 (e.g., device 702), and a server application resides on an external server (e.g., server 706). For example, a media guidance application may be implemented partially as a client application on control circuitry 604 of device 600 and partially on server 706 as a server application running on control circuitry. Server 706 may be a part of a local area network with device 702, or may be part of a cloud computing environment accessed via the Internet. In a cloud computing environment, various types of computing services for performing searches on the Internet or informational databases, providing storage (e.g., for the previously received user inputs and their receipt times) or parsing data are provided by a collection of networkaccessible computing and storage resources (e.g., server 706), referred to as "the cloud." Device 600 may be a cloud client that relies on the cloud computing capabilities from server 706 to generate the personalized answers of the media guidance application. When executed by control circuitry of server 706, the media guidance application may instruct the control circuitry to generate the media guidance application output (e.g., the execution of the user input) and transmit the generated output to device 702. The client application may instruct control circuitry of the receiving device 702 to generate the media guidance application output. Alternatively, device 702 may perform all computations locally via control circuitry 604 without relying on server 706.

Control circuitry 604 may include communications circuitry suitable for communicating with a media guidance application server or other networks or servers. The instructions for carrying out the above-mentioned functionality may be stored and executed on server 706. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of devices, or communication of devices in locations remote from each other.

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Nonvolatile memory may also be used (e.g., to launch a boot-up routine and other instructions). Cloud-based storage (e.g., on server 706) may be used to supplement storage 608 or instead of storage 608.

A user may send instructions to control circuitry 604 using user input interface 610 of device 600. User input interface 610 may be any suitable user interface touch screen, touchpad, stylus and may be responsive to external device add-ons such as a remote control, mouse, trackball, keypad, keyboard, joystick, voice recognition interface, or other user input interfaces. Display 610 may be a touch-screen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Speakers 614 may be provided as integrated with other elements of user equipment device 600 or may be stand-alone units. An audio component of the personalized answer and other content displayed on display 612 may be played through speakers 614. In some embodiments, the audio may be distributed to a receiver (not shown), which processes and outputs the audio via speakers 614.

Control circuitry 604 may allow a user to provide user profile information or may automatically compile user profile information. For example, control circuitry 604 may monitor the user's input history and receipt times over various devices. In some embodiments, control circuitry 604 monitors user inputs such as texts, calls, conversation audio, social media posts, etc., to update the active user profile on a device. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different devices.

Figure 7:
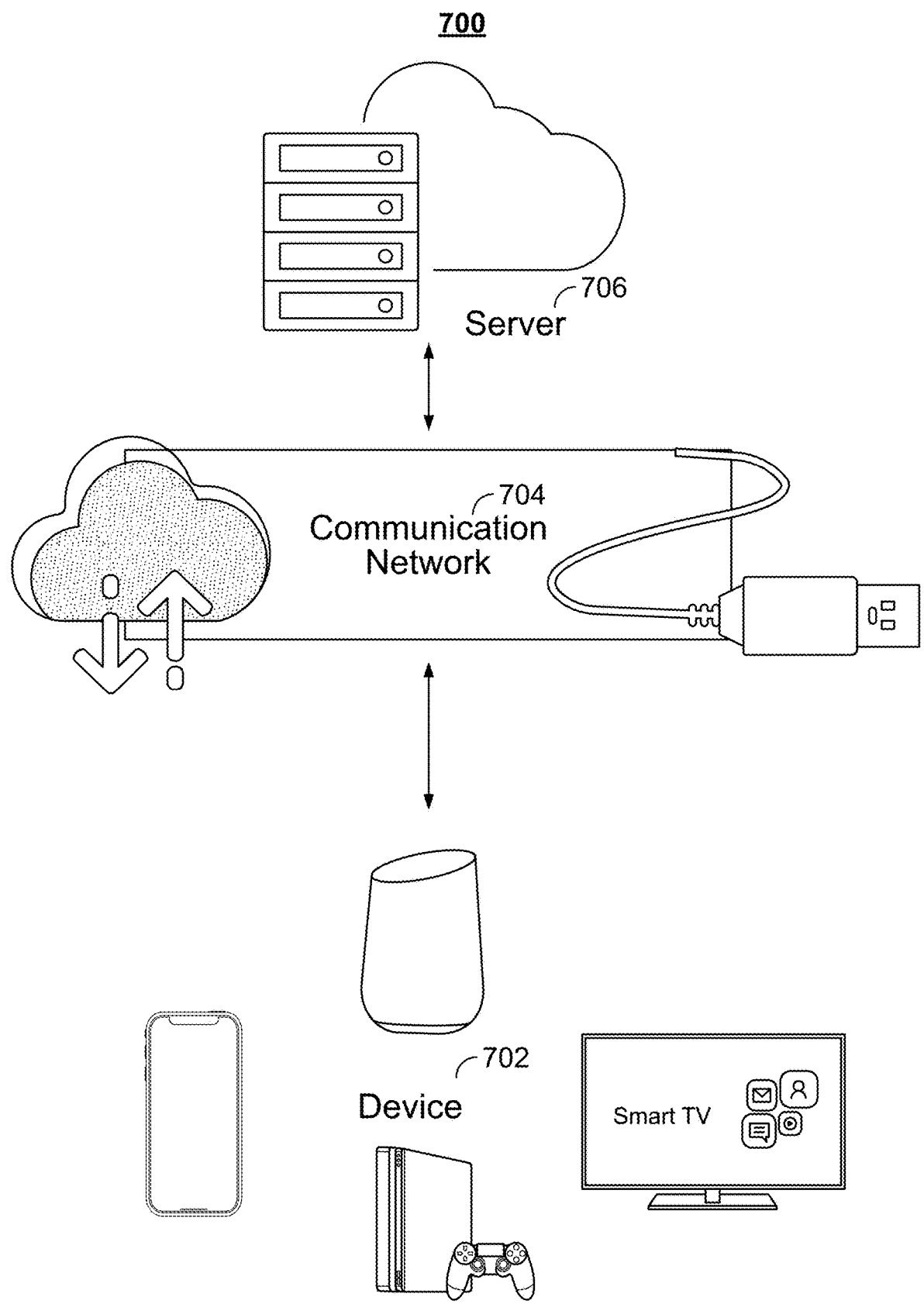
FIG. 7 is a diagram of an illustrative media system in accordance with some embodiments of the disclosure.

As depicted in FIG. 7, device 702 may be coupled to communication network 704. Communication network 704 may be one or more networks including the Internet, a mobile phone network, mobile voice or data network (e.g., a 4G or LTE network), cable network, public switched telephone network, Bluetooth, or other types of communications network or combinations of communication networks. Thus, device 702 may communicate with server 706 over communication network 704 via communications circuitry described above. In should be noted that there may be more than one server 706, but only one is shown in FIG. 7 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths.

Figure 8:
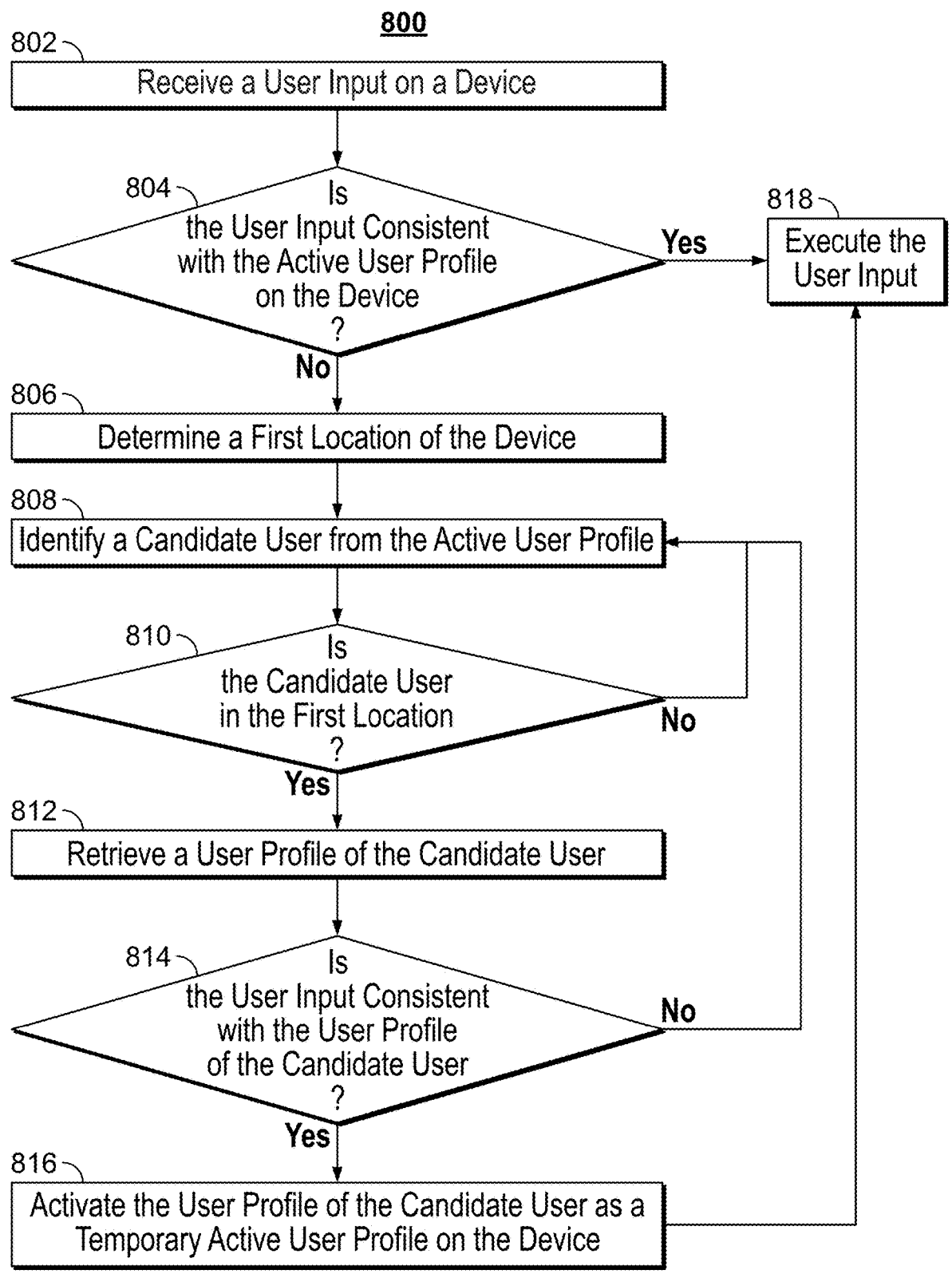
FIG. 8 is a flowchart of a detailed illustrative process for activating a user profile for temporary use on a device, in accordance with some embodiments of the disclosure.

FIG. 8 is a flowchart of detailed illustrative process 800 for activating a user profile for temporary use on a device, in accordance with some embodiments of the disclosure. At 802, control circuitry (e.g., control circuitry 604) of the device receives a user input (e.g., via I/O Path 602). For example, control circuitry 604 of device 102 receives a selection of a media asset "Friends" for viewing on a video streaming application (e.g., the Netflix mobile application). At 804, control circuitry (e.g., control circuitry 604) determines whether the user input is consistent with the active user profile (e.g., stored in storage 608) on the device. The processes for determining user input consistency are described in further detail in FIGS. 9, 10, and 11. For example, control circuitry 604 determines whether the selected media asset "Friends" is present in the viewing or search history of the user's Netflix profile. If the selected media asset is present in the viewing or search history, control circuitry 604 determines that the user previously selected the media asset (i.e., provided the same user input at a previous time) and therefore the user input is not an outlier (e.g., a user input made by mistake or by another user). Thus, if at 804 control circuitry (e.g., control circuitry 604) determines that the user input is consistent with the active user profile, process 800 proceeds to 818. If "Friends" is not present in the viewing or search history, control circuitry 604 determines that the selection is inconsistent with the user's normal behavior as captured by the active user profile.

In response to determining that the user input is inconsistent with the active user profile, at 806, control circuitry (e.g., control circuitry 604) determines a first location of the device. For example, control circuitry 604 retrieves the GPS coordinates of device 102 (e.g., location 202). The GPS coordinates may be at a certain restaurant in New York City. At 808, control circuitry 604 identifies a candidate user from the active user profile. The identification process of the candidate user is described in further detail in FIG. 12. For example, control circuitry 604 may access a third-party application such as a social media application (e.g., the Facebook mobile application) to identify a list of candidate users. Control circuitry 604 proceeds to select a candidate user from the list. At 810, control circuitry (e.g., control circuitry 604) determines whether the candidate user is in the first location. For example, the candidate user may have posted a check-in social media post at the restaurant in New York City where device 102 is present. Control circuitry 604 thus determines that location of the candidate user by scraping the social media profile of the candidate user and identifying the check-in post. In some embodiments, control circuitry 604 searches for a current location of the candidate user by setting a threshold period of time within which the location of the candidate user should be updated. For example, control circuitry 604 determines that the check-in social media post was made two hours prior to the current time. Control circuitry 604 retrieves the threshold period of time (e.g., three hours) from storage 608 and determines whether the time the location of the candidate user was most recently updated (e.g., the check-in post may have been the most recent social media post made by the candidate user that indicates a location) is within the threshold period of time. In response to determining that the location update time of the candidate user is within the threshold period of time, control circuitry 604 determines that the candidate user is currently located in the first location (i.e., the location of the device).

In response to determining that the candidate user is not in the first location, process 800 returns to 808 where control circuitry (e.g., control circuitry 604) identifies a different candidate user from the active user profile (e.g., a different individual on the social media friends list as depicted in FIG. 2). In response to determining that the candidate user is in the first location, control circuitry 604 retrieves a user profile of the candidate user by first retrieving identification information (e.g., a name, contact information, date of birth, etc.) of the candidate user from the Internet (e.g., from the social media profile of the candidate user). Using the identification information, control circuitry 604 determines whether the candidate user has a user profile associated with the application on which the user input was provided. For example, if the user input is received on a video streaming application such as the Netflix website or app, control circuitry 604 determines whether the candidate user has a user profile associated with the video streaming application (i.e., whether the candidate user has a Netflix account). In another example, if the user input is received on a set-top box of a content provider such as TiVo™, control circuitry 604 determines whether the candidate user has a user profile associated with the content provider TiVo. Specifically, control circuitry 604 searches a user database of the content provider of interest to determine whether a user profile of the candidate user exists in the database. In response to determining that the user profile exists, control circuitry 604 retrieves the user profile of the candidate user from the user database comprising a plurality of user profiles. For example, control circuitry 604 may retrieve the Netflix user profile of the candidate user from a Netflix database of user information on server 706 over communications network 704 (e.g., an Internet connection).

At 814, control circuitry (e.g., control circuitry 604) determines whether the user input is consistent with the user profile of the candidate user. For example, control circuitry 604 determines whether the user profile of the candidate user indicates that the candidate user has previously provided the user input (e.g., performed a selection of the media asset "Friends" on Netflix). In response to determining that the user input is inconsistent with the user profile, process 800 returns to 808, where control circuitry (e.g., control circuitry 604) selects a different candidate user.

In response to determining that the user input is consistent with the user profile of the candidate user, at 816, control circuitry (e.g., control circuitry 604) activates the user profile of the candidate user as a temporary active user profile on the device. For example, control circuitry 604 retrieves access credentials (e.g., a username and password) associated with the user profile of the candidate user from server 706 or a device owned by the candidate user. Control circuitry 604 may log out of the active user profile and log in to the user profile of the candidate user using the access credentials. Process 800 then proceeds to 818, where control circuitry (e.g., control circuitry 604) executes the user input to produce an output (e.g., begins the stream of "Friends"). It should be noted that 804-814 may be performed by control circuitry on server 706 or by control circuitry 604 on device 702.

Figure 9:
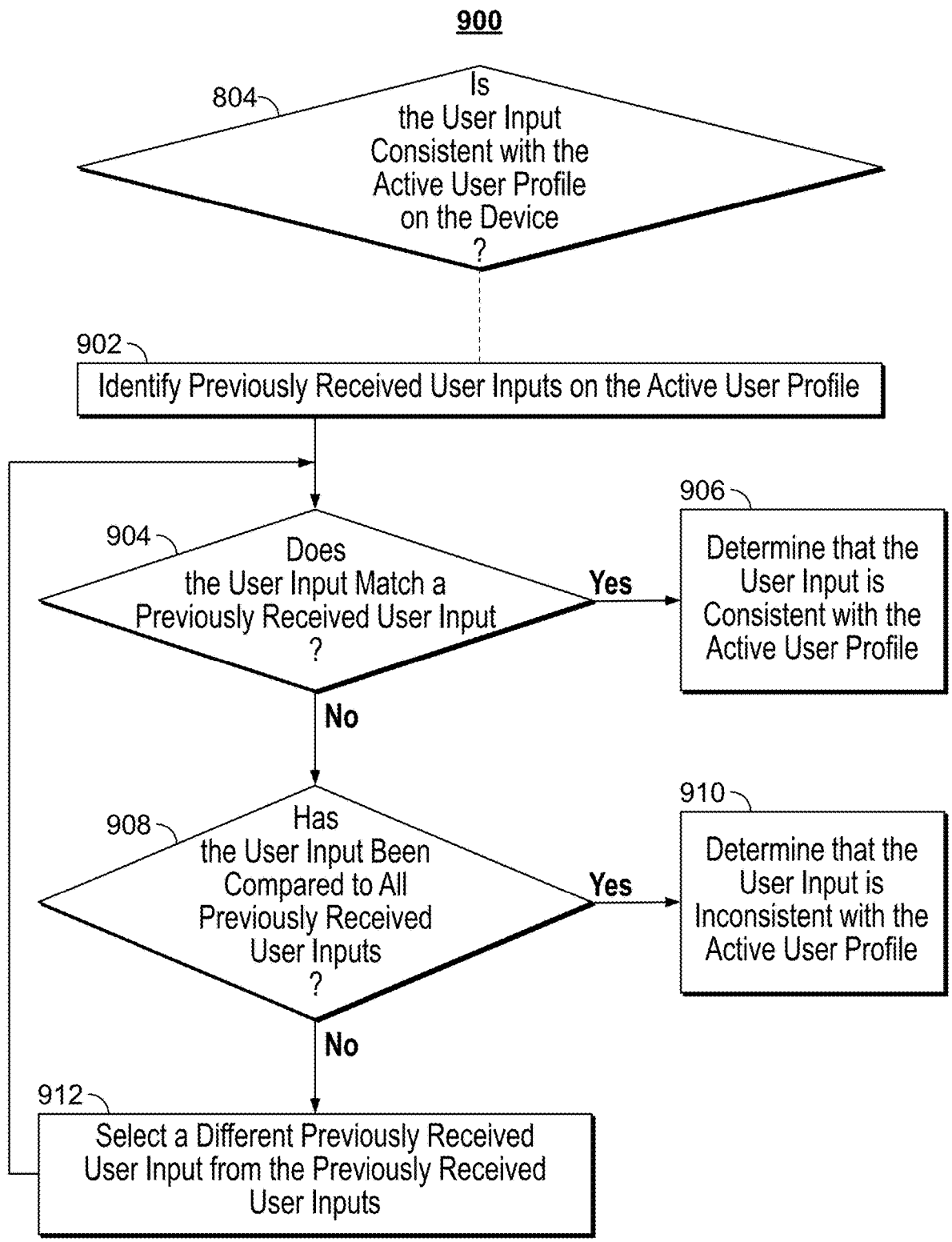
FIG. 9 is a flowchart of an illustrative process for determining whether a user input is inconsistent with the active user profile on the device based on previously received user inputs, in accordance with some embodiments of the disclosure.

FIG. 9 is a flowchart of illustrative process 900 for determining whether a user input is inconsistent with the active user profile on the device based on previously received user inputs, in accordance with some embodiments of the disclosure. FIG. 9 elaborates on 804 of FIG. 8. At 902, control circuitry (e.g., control circuitry 604) identifies previously received user inputs (e.g., stored in storage 608 of device 702 or server 706) on the active user profile. For example, control circuitry 604 extracts the search history or the viewing history of the user on his/her Netflix user profile. At 904, control circuitry (e.g., control circuitry 604) determines whether the user input matches a previously received user input. For example, if the user input is a search for the media asset "Friends," control circuitry 604 determines whether the search history includes a prior search for the media asset "Friends." In response to determining a match, process 900 ends at 906 where control circuitry (e.g., control circuitry 604) determines that the user input is consistent with the active user profile (i.e., the user input is one that the user would normally make).

In response to determining the user input does not match a previously received user input, at 908 control circuitry (e.g., control circuitry 604) determines whether the user input has been compared to all previously received user inputs. For example, the previously received user inputs may be a data structure comprising various selections and search commands. Control circuitry 604 may determine consider each entry in the data structure for comparison with the user input. If a match is not found for one entry, control circuitry 604 moves on to the next entry of the data structure to perform the comparison. If the user input has not been compared to all previously received inputs, at 912 control circuitry (e.g., control circuitry 604) selects a different previously received user input to compare with the user input (i.e., process 900 returns to 904). In response to determining that the user input has been compared to all previously received user inputs in storage 608 and no match has been found, process 900 ends at 910 where control circuitry (e.g., control circuitry 604) determines that the user input is inconsistent with the active user profile (i.e., the user would not normally provide the user input).

Figure 10:
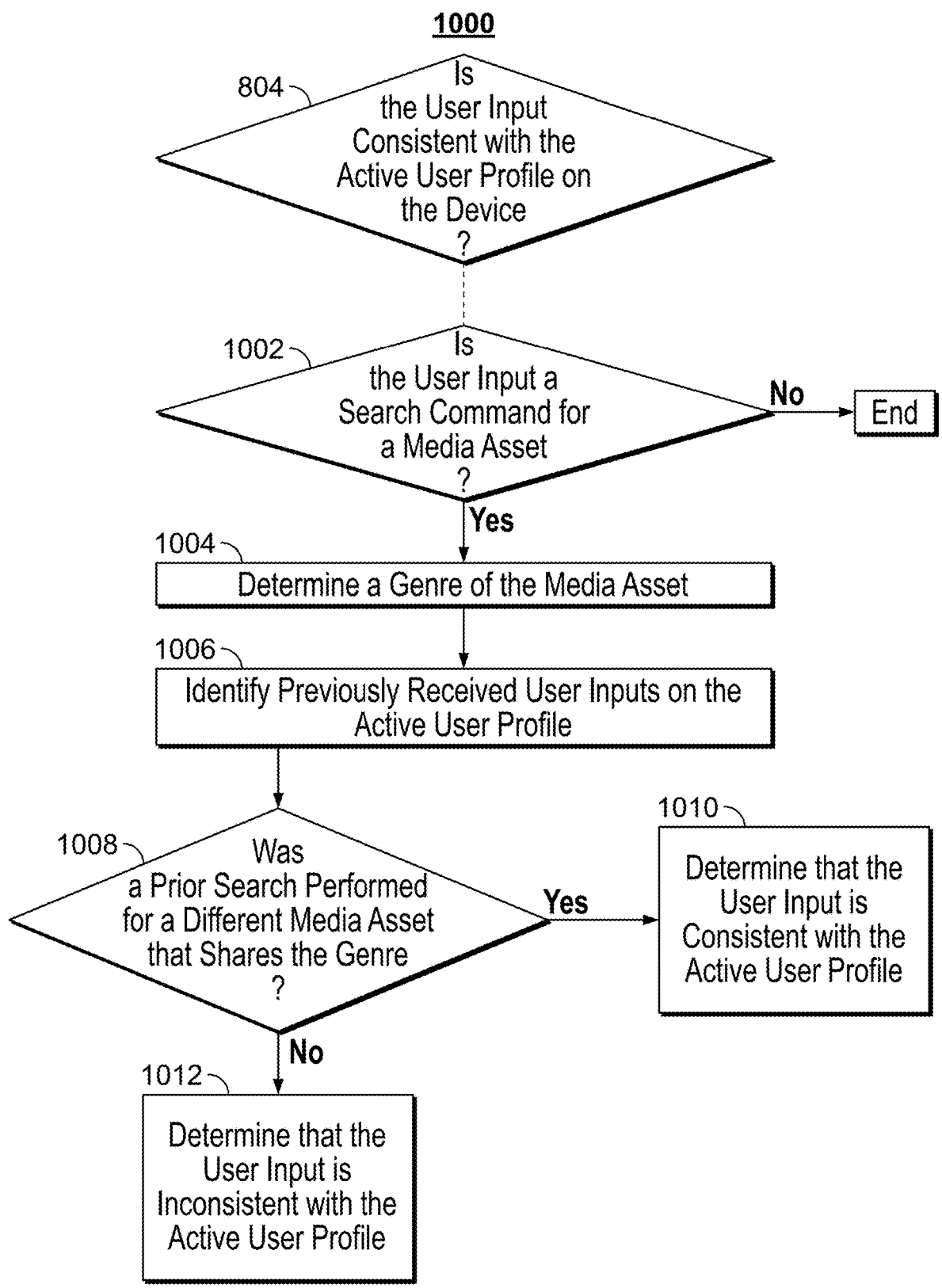
FIG. 10 is a flowchart of an illustrative process for determining whether a search for a media asset is inconsistent with the active user profile on the device based on a genre of the media asset, in accordance with some embodiments of the disclosure.

FIG. 10 is a flowchart of illustrative process 1000 for determining whether a search for a media asset is inconsistent with the active user profile on the device based on a genre of the media asset, in accordance with some embodiments of the disclosure. FIG. 10 elaborates on 804 of FIG. 8. At 1002, control circuitry (e.g., control circuitry 604) determines whether the user input is a search command for a media asset. For example, control circuitry 604 may categorize various user inputs into an input type. Input types can include, but are not limited to, searches, selections, trick-play, etc. When a user input is received at the device, control circuitry 604 assigns an input type to the user input. For example, control circuitry 604 may receive a text or verbal input "Friends" in a search bar. Because the input was received via a search bar, control circuitry 604 assigns the user input the "search" input type. Additionally, the input "Friends" may yield a search result for a media asset titled "Friends."

In response to determining that the user input is not a search command for a media asset, process 1000 ends. However, if control circuitry (e.g., control circuitry 604) determines that the user input is a search command for a media asset (e.g., the input type of the user input is "search" and a media asset is mentioned in the search), at 1004 control circuitry (e.g., control circuitry 604) determines a genre of the media asset. For example, control circuitry 604 retrieves metadata information of the media asset from a content provider over communication network 704. Based on the metadata, control circuitry 604 may determine that the genre of "Friends" is "comedy." At 1006, control circuitry (e.g., control circuitry 604) identifies previously received user inputs on the active user profile (e.g., stored on storage 608 of device 702 or server 706). At 1008, control circuitry (e.g., control circuitry 604) determines whether a prior search from the previously received user inputs was performed for a different media asset that shares the genre of the media asset associated with the current search command. For example, the search history of the active user profile may include a search for the show "How I Met Your Mother" which has a genre of "comedy." In response to determining that a prior search for a different media asset with the same genre of the media asset associated with the current search command was performed, at 1010, control circuitry (e.g., control circuitry 604) determines that the user input is consistent with the active user profile. If control circuitry 604 is unable to find the prior search for the different media asset, at 1012, control circuitry 604 determines that the user input is inconsistent with the active user profile.

Figure 11:
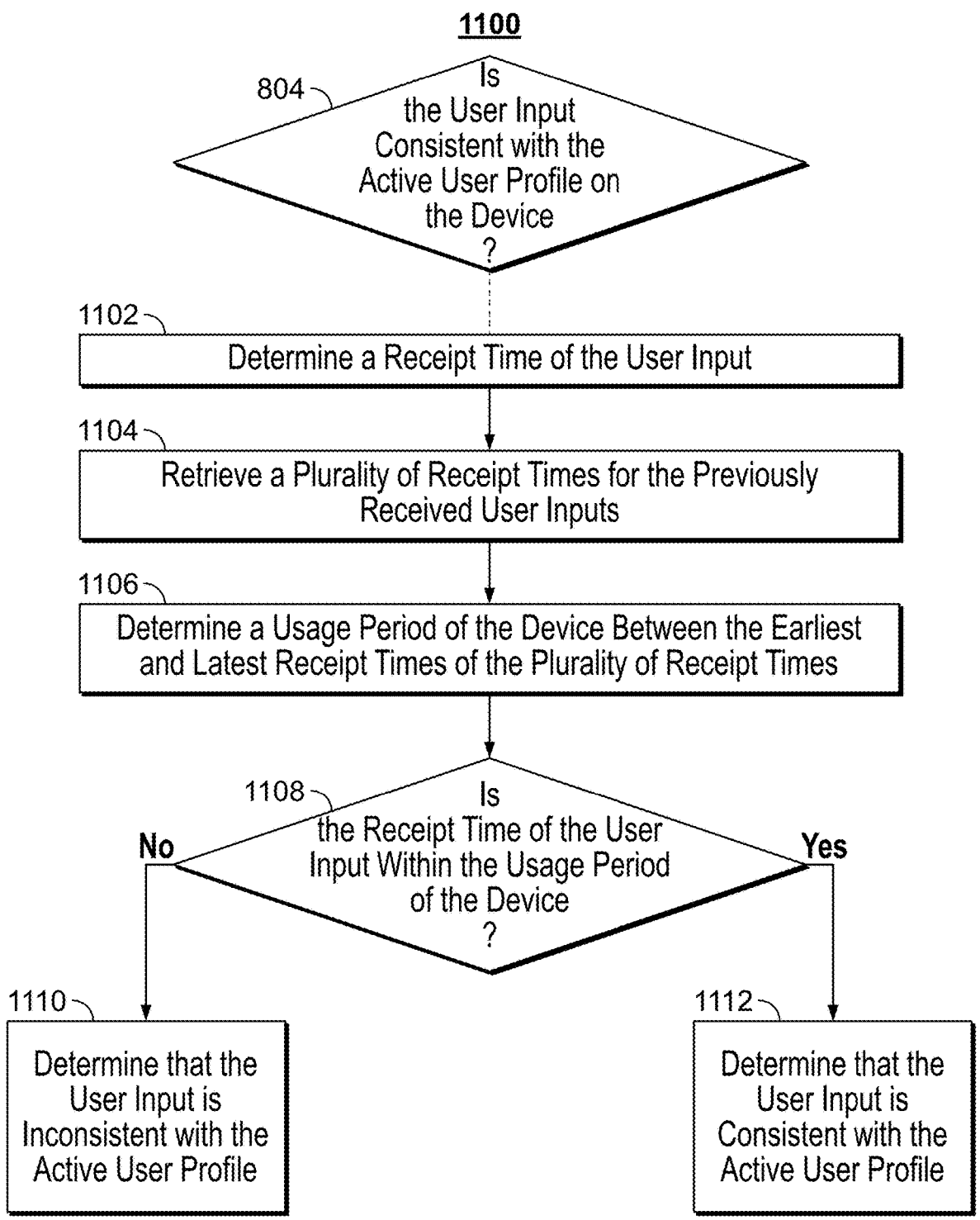
FIG. 11 is a flowchart of an illustrative process for determining whether a user input is inconsistent with the active user profile on the device based on the receipt time of the user input, in accordance with some embodiments of the disclosure.

FIG. 11 is a flowchart of an illustrative process for determining whether a user input is inconsistent with the active user profile on the device based on the receipt time of the user input, in accordance with some embodiments of the disclosure. FIG. 11 elaborates on 804 of FIG. 8. At 1102, control circuitry (e.g., control circuitry 604) determines a receipt time of the user input. For example, control circuitry 604 may receive the user input at 10:20 am. At 1104, control circuitry (e.g., control circuitry 604) retrieves a plurality of receipt times for previously received user inputs from the active user profile. For example, control circuitry 604 may determine the times when various media assets were selected on the Netflix mobile application. At 1106, control circuitry (e.g., control circuitry 604) determines a usage period of the device between the earliest and the latest receipt times of the plurality of receipt times. For example, control circuitry 604 may determine that the earliest receipt time for a selection of a media asset on the Netflix application was 7:10 pm and the latest receipt time was 9:00 pm. Based on these times, control circuitry 604 determines that the usage period is between 7:10 pm and 9:00 pm. At 1108, control circuitry (e.g., control circuitry 604) determines whether the receipt time of the user input is within the usage period of the device. In response to determining that the receipt time is not in the usage period, at 1110, control circuitry (e.g., control circuitry 604) determines that the user input is inconsistent with the active user profile. For example, because the user input was received at 10:20 am, which is outside of the usage period, control circuitry 604 determines that the user input is not one that the user associated with the active user profile would normally make. In response to determining that the receipt time is in the usage period, at 1112, control circuitry (e.g., control circuitry 604) determines that the user input is consistent with the active user profile. For example, if the user input was received by control circuitry 604 at 7:30 pm, control circuitry 604 would deem the user input one that would normally be made.

It should be noted that processes 900, 1000, and 1100 may be combined to determine user input consistency. For example, in order to be deemed consistent with the active user profile, control circuitry (e.g., control circuitry 604) may in some embodiments require that the user input both match a previously received user input and be received within the usage period.

Figure 12:
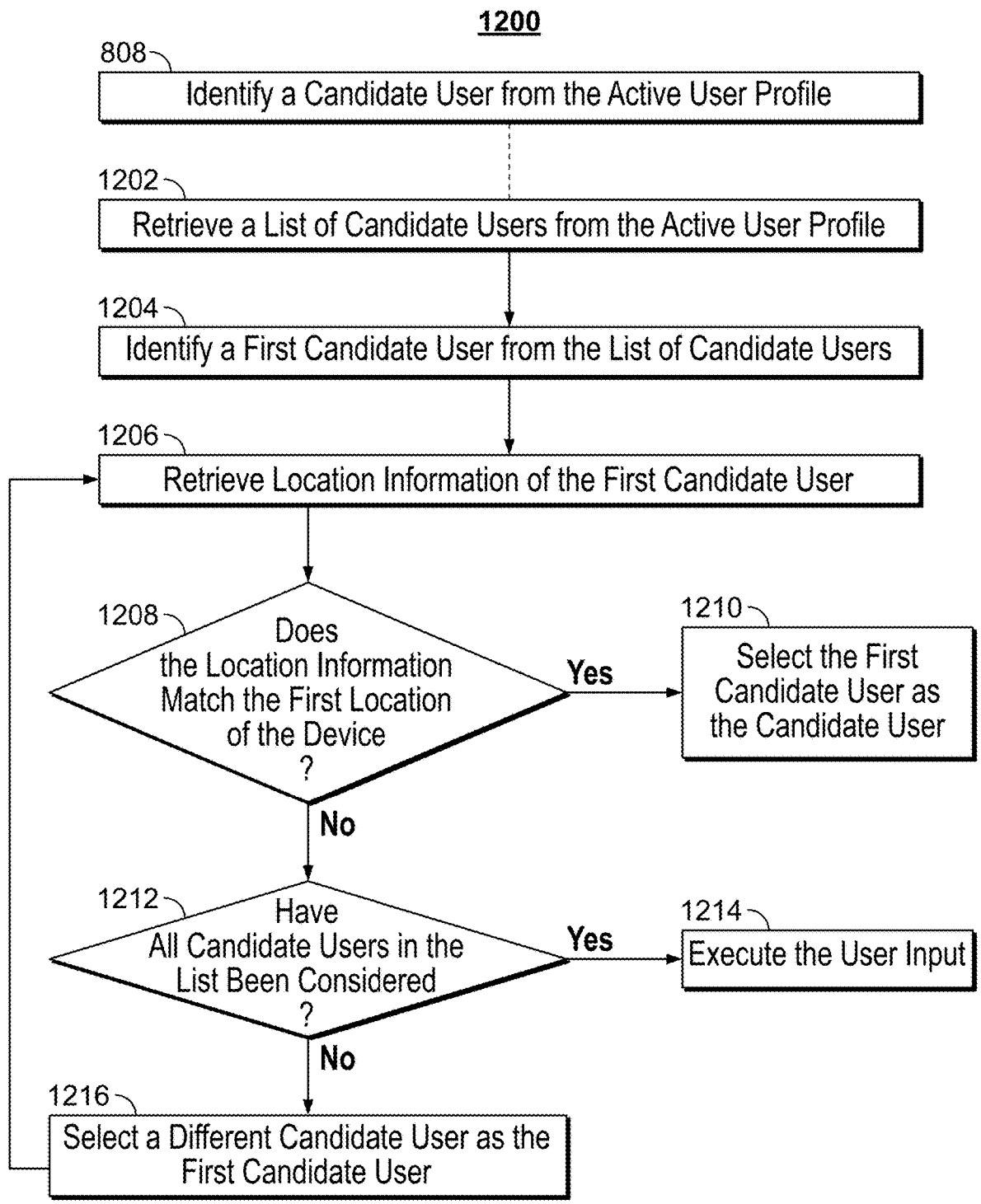
FIG. 12 is a flowchart of an illustrative process for identifying a candidate user that shares a location with the device, in accordance with some embodiments of the disclosure.

FIG. 12 is a flowchart of illustrative process 1200 for identifying a candidate user that shares a location with the device, in accordance with some embodiments of the disclosure. Process 1200 elaborates on 808 of FIG. 8. At 1202, control circuitry (e.g., control circuitry 604) retrieves a list of candidate users from the active user profile. For example, control circuitry 604 may retrieve a contact list stored in device 702 (e.g., in storage 608). At 1204, control circuitry (e.g., control circuitry 604) identifies a first candidate user from the list of candidate users. Referring back to FIG. 2, control circuitry 604 may consider Friend A from the list. At 1206, control circuitry (e.g., control circuitry 604) retrieves location information of the first candidate user. For example, control circuitry 604 may access the social media profile of the first candidate user to determine his/her location. At 1208, control circuitry (e.g., control circuitry 604) determines whether the location information matches the first location of the device. For example, the location of the device may be at a restaurant based on retrieved GPS coordinates. The location of the candidate user, based on his social media profile, may also be at the restaurant. In response to determining that the location information matches, process 1200 ends at 1210 where control circuitry (e.g., control circuitry 604) selects the first candidate user as the candidate user.

In response to determining that the location information does not match, at 1212 control circuitry (e.g., control circuitry 604) determines whether all candidate users of the list have been considered (i.e., determine whether their respective location matches the location of the device). If not all candidate users of the list have been considered, at 1216 control circuitry (e.g., control circuitry 604) selects a different candidate user (e.g., Friend A, Friend B, etc., of FIG. 2) and process 1200 returns to 1206. In response to determining that all candidate users of the list have been considered and none of them has a matching location with the location of the device, process 1200 ends at 1214 where control circuitry (e.g., control circuitry 604) executes the user input as a part of the active user profile. This implies that the user may have provided the user input himself/ herself because no other possible users had access to the device.

Figure 13:
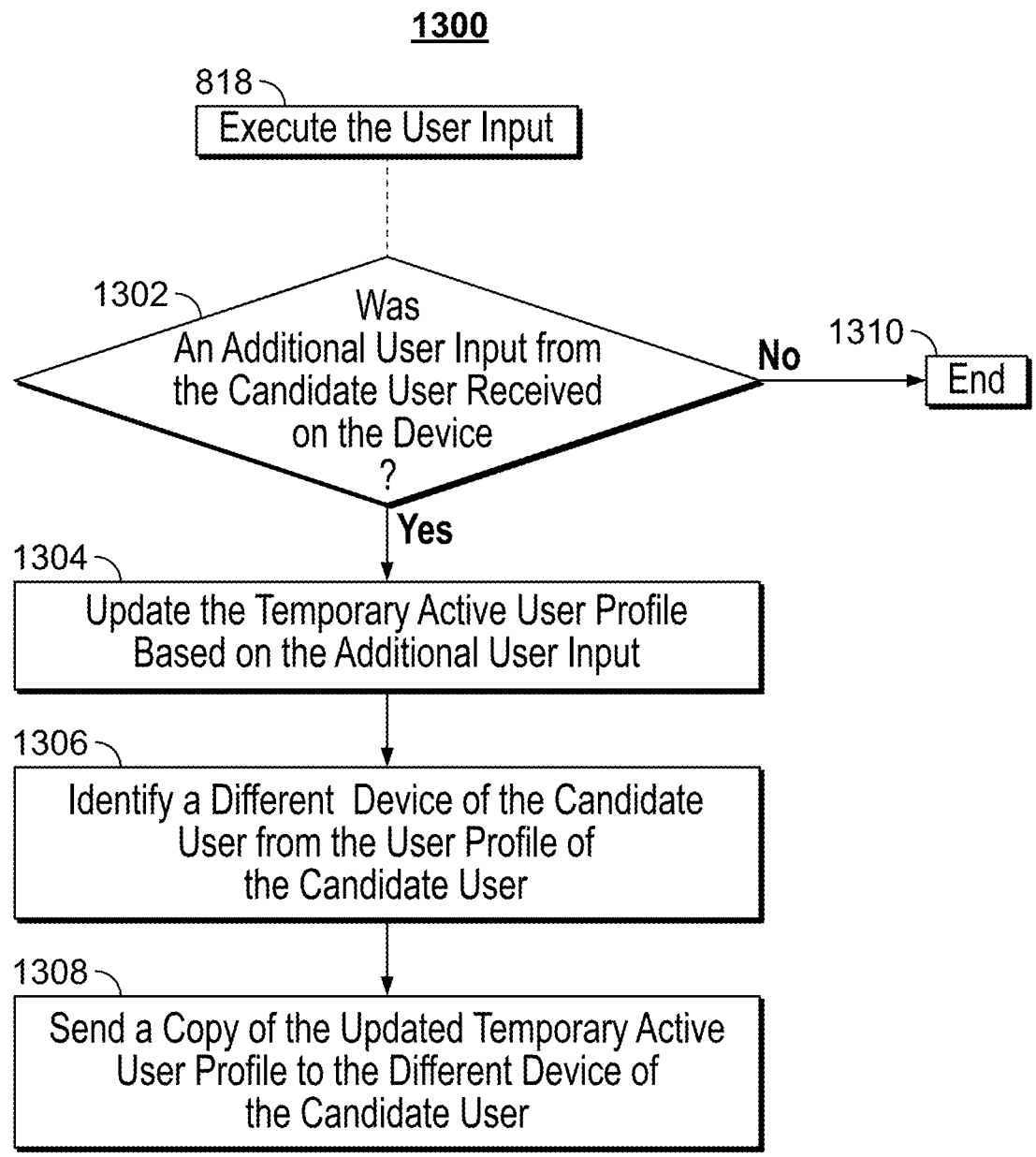
FIG. 13 is a flowchart of an illustrative process for executing the user input on a temporary active user profile, in accordance with some embodiments of the disclosure.

FIG. 13 is a flowchart of illustrative process 1300 for executing the user input on a temporary active user profile, in accordance with some embodiments of the disclosure. Process 1300 elaborates on 818 of FIG. 8. At 1302, control circuitry (e.g., control circuitry 604) determines whether an additional user input from the candidate user has been received on the device (e.g., via I/O Path 602). For example, control circuitry 604 may receive a search command for the media asset "How I Met Your Mother" subsequent to receiving the selection of the media asset "Friends" on Netflix. If no additional user inputs have been received, process 1300 ends. However, if an additional user input has been received from the candidate user, at 1304 control circuitry (e.g., control circuitry 604) updates the temporary active user profile based on the additional user input. For example, control circuitry 604 adds the search for "How I Met Your Mother" to the search history of the temporary active user profile.

At 1306, control circuitry (e.g., control circuitry 604) identifies a different device of the candidate user from the user profile of the candidate user. For example, control circuitry 604 of the device may broadcast a discovery message (e.g., over communications network 704). Referring to FIG. 5, device 502 may send a discovery message to device 506 (e.g., the different device of the candidate user), which may respond to device 502 with an acknowledgement message. The acknowledgment message may include an indication that device 506 belongs to the candidate user (e.g., by including the name of the candidate user). At 1308, control circuitry (e.g., control circuitry 604) sends a copy of the updated temporary active user profile to the different device of the candidate user (e.g., over communication network 704). For example, control circuitry 604 of device 502 sends the updated search history to device 506 for storage. In some embodiments, control circuitry 604 of device 502 uploads the updates of the user profile to the cloud (e.g., server 706 via communications network 704, which may be a Netflix server connected via the Internet). Device 506 may then download the updates from server 706.

It should be noted that processes 800-1300 or any step thereof could be performed on, or provided by, any of the devices shown in FIGS. 6-7. For example, the processes may be executed by control circuitry 604 (FIG. 6) as instructed by a media guidance application implemented on device 702 and/or server 706. In addition, one or more steps of a process may be incorporated into or combined with one or more steps of any other process or embodiment (e.g., steps from process 900 may be combined with steps from process 1100). In addition, the steps and descriptions described in relation to FIGS. 8-13 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method for identifying a user profile for temporary use on a device, the method comprising:
   receiving a user input on a first device, wherein the first device is in a first location;
   comparing the user input with an active user profile, of a first user, on the first device; and
   in response to determining, based on the comparing, that the user input is inconsistent with the active user profile:
      detecting that a second device is located within a threshold distance of the first location, wherein the second device is associated with a second user different from the first user;
      determining whether the user input received on the first device is consistent with a user profile of the second user associated with the second device detected within the threshold distance of the first location; and
      in response to determining that the user input is consistent with the user profile of the second user, activating the user profile of the second user as a temporary active user profile on the first device.

2. The method of claim 1, wherein determining whether the user input is inconsistent with the active user profile comprises:
   identifying previously received user inputs on the active user profile;
   determining whether the user input matches any of the previously received user inputs on the active user profile; and
   in response to determining that the user input does not match any of the previously received user inputs on the active user profile, determining that the user input is inconsistent with the active user profile.

3. The method of claim 1, wherein determining whether the user input is inconsistent with the active user profile comprises:
   determining a receipt time of the user input;
   retrieving a plurality of receipt times for the previously received user inputs;
   determining a usage period of the device based on the plurality of receipt times;
   determining whether the receipt time of the user input is within the usage period of the device; and
   in response to determining that the receipt time is not within the usage period, determining that the user input is inconsistent with the active user profile.

4. The method of claim 1, wherein identifying the second device that is located within the threshold distance of the first location further comprises selecting the second user from a list of candidate users in the active user profile of the device, wherein the list of candidate users is:
   a list of social media friends associated with an owner of the device,
   a list of contacts stored on the device, or
   a list of owners of the device.

5. The method of claim 4, wherein selecting the second user from the list of candidate users comprises:
   identifying a first candidate user from the list of candidate users;
   retrieving location information of the first candidate user;
   determining whether the location information matches the first location; and in response to determining that the location information matches the first location, selecting the first candidate user as the second user.

6. The method of claim 1, wherein location information of the first second user is retrieved from any one of:
a social media profile of the second user,
metadata of media uploaded to a website by the second user,
a message on the device received from the second user,
a global-positioning system (GPS) tracker on the second device, and
a travel record of the second user.

7. The method of claim 1, further comprising:
receiving an additional user input on the device from the second user;
updating the temporary active user profile based on the additional user input; and
sending a copy of the updated temporary active user profile to the second device.

8. The method of claim 1, wherein the user input is a search command for a media asset and wherein comparing the user input with the active user profile comprises:
determining a genre of the media asset;
determining, from previously received user inputs in the active user profile, whether a prior search for a different media asset that shares the genre exists;
in response to determining that the prior search for the different media asset that shares the genre does not exist, determining that the user input is inconsistent with the active user profile.

9. The method of claim 1, further comprising:
in response to determining that the user input is not consistent with the user profile of the second user, selecting a different candidate user from a list of candidate users on the active user profile.

10. The method of claim 1, further comprising:
generating, for display on the device, a query to confirm whether the user input was received from the second user;
in response to receiving a confirmation to the query, activating the user profile of the second user as the temporary active user profile on the device.

11. A system for identifying a user profile for temporary use on a device, the system comprising:
user input interface configured to:
receive a user input on a first device, wherein the first device is in a first location;
control circuitry configured to:
compare the user input with an active user profile, of a first user, on the first device; and
in response to determining, based on the comparing, that the user input is inconsistent with the active user profile:
detecting that a second device is located within a threshold distance of the first location, wherein the second device is associated with a second user different from the first user;
determine whether the user input received on the first device is consistent with a user profile of the second user associated with the second device detected within the threshold distance of the first location; and
in response to determining that the user input is consistent with the user profile of the second user, activate the user profile of the second user as a temporary active user profile on the first device.

12. The system of claim 11, wherein the control circuitry is configured to determine whether the user input is inconsistent with the active user profile by:
identifying previously received user inputs on the active user profile;
determining whether the user input matches any of the previously received user inputs on the active user profile; and
in response to determining that the user input does not match any of the previously received user inputs on the active user profile, determining that the user input is inconsistent with the active user profile.

13. The system of claim 11, wherein the control circuitry is configured to determine whether the user input is inconsistent with the active user profile by:
determining a receipt time of the user input;
retrieving a plurality of receipt times for the previously received user inputs;
determining a usage period of the device based on the plurality of receipt times;
determining whether the receipt time of the user input is within the usage period of the device; and
in response to determining that the receipt time is not within the usage period, determining that the user input is inconsistent with the active user profile.

14. The system of claim 11, wherein the control circuitry is configured to identify the second device that is located within the threshold distance of the first location further by selecting the second user from a list of candidate users in the active user profile of the device, wherein the list of candidate users is:
a list of social media friends associated with an owner of the device,
a list of contacts stored on the device, or
a list of owners of the device.

15. The system of claim 14, wherein the control circuitry is configured to select the second user from the list of candidate users by:
identifying a first candidate user from the list of candidate users;
retrieving location information of the first candidate user;
determining whether the location information matches the first location; and
in response to determining that the location information matches the first location, selecting the first candidate user as the second user.

16. The system of claim 11, wherein location information of the second user is retrieved from any one of:
a social media profile of the second user,
metadata of media uploaded to a website by the second user,
a message on the device received from the second user,
a global-positioning system (GPS) tracker on the second device, and
a travel record of the second user.

17. The system of claim 11, wherein the control circuitry is further configured to:
receive an additional user input on the device from the second user;
update the temporary active user profile based on the additional user input; and
send a copy of the updated temporary active user profile to the second device.

18. The system of claim 11, wherein the user input is a search command for a media asset and wherein the control circuitry is configured to compare the user input with the active user profile by:

determining a genre of the media asset;

determining, from previously received user inputs in the active user profile, whether a prior search for a different media asset that shares the genre exists;

in response to determining that the prior search for the different media asset that shares the genre does not exist, determining that the user input is inconsistent with the active user profile.

19. The system of claim 11, wherein the control circuitry is further configured to:

in response to determining that the user input is not consistent with the user profile of the second user, select a different candidate user from a list of candidate users on the active user profile.

20. The system of claim 11, wherein the control circuitry is further configured to:

generate, for display on the device, a query to confirm whether the user input was received from the second user;

in response to receiving a confirmation to the query, activate the user profile of the second user as the temporary active user profile on the device.

* * * * *

UNITED STATES PATENT AND TRADEMARK OFFICE
CERTIFICATE OF CORRECTION

PATENT NO. : 10,863,219 B2
APPLICATION NO. : 16/365283
DATED : December 8, 2020
INVENTOR(S) : Srinivasan et al.

Page 1 of 1

It is certified that error appears in the above-identified patent and that said Letters Patent is hereby corrected as shown below:

In the Claims

At Column 19, Claim 6, Line 5, delete "first" before "second user".

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*